United States Patent
Negro et al.

(10) Patent No.: US 11,470,480 B2
(45) Date of Patent: Oct. 11, 2022

(54) MULTI-STAGE RECEIVER DESIGN COVERING LISTEN BEFORE TALK FAILURES

(71) Applicant: QUALCOMM Incorporated, San Diego, CA (US)

(72) Inventors: Francesco Negro, Nuremberg (DE); Stefan Brueck, Neunkirchen am Brand (DE); Tae Min Kim, San Diego, CA (US); Jing Sun, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 16/905,768

(22) Filed: Jun. 18, 2020

(65) Prior Publication Data
US 2020/0404510 A1 Dec. 24, 2020

Related U.S. Application Data

(60) Provisional application No. 62/864,190, filed on Jun. 20, 2019.

(51) Int. Cl.
*H04L 25/02* (2006.01)
*H04W 16/14* (2009.01)
(Continued)

(52) U.S. Cl.
CPC .......... *H04W 16/14* (2013.01); *H04L 1/0026* (2013.01); *H04L 25/0202* (2013.01);
(Continued)

(58) Field of Classification Search
CPC ............... H04L 25/0202; H04L 25/022; H04L 27/0006; H04W 16/14
See application file for complete search history.

(56) References Cited

U.S. PATENT DOCUMENTS

| | | | |
|---|---|---|---|
| 2020/0221325 A1* | 7/2020 | Zheng | H04W 28/00 |
| 2020/0367242 A1* | 11/2020 | Moon | H04L 1/00 |
| 2020/0373993 A1* | 11/2020 | Wu | H04B 17/318 |

FOREIGN PATENT DOCUMENTS

| | | |
|---|---|---|
| EP | 3678408 A1 | 7/2020 |
| WO | WO-2018199685 A1 | 11/2018 |
| WO | WO-2019057073 A1 | 3/2019 |

OTHER PUBLICATIONS

International Search Report and Written Opinion—PCT/US2020/038627—ISA/EPO—dated Sep. 10, 2020.

\* cited by examiner

*Primary Examiner* — Hoon J Chung
(74) *Attorney, Agent, or Firm* — Dalei Dong; Holland & Hart LLP

(57) ABSTRACT

Techniques for wireless communications are described. A user equipment (UE) may initially configure a set of channel estimation parameters for a set of radio frequency spectrum subbands of a bandwidth part (BWP) of a transmission opportunity (TxOP). In some examples, the UE may identify an unavailable radio frequency spectrum subband within the BWP. Based on the identification, the UE may reconfigure the channel estimation parameters to avoid performing unnecessary channel estimation processes on the unavailable radio frequency spectrum subband. As part of reconfiguring the channel estimation parameters, the UE may set log-likelihood ratio (LLR) values of subcarriers associated with the unavailable radio frequency spectrum subband to a null value, thereby experiencing improvements in efficiency and reliability of channel estimation for the BWP.

30 Claims, 12 Drawing Sheets

(51) Int. Cl.
*H04L 1/00* (2006.01)
*H04L 27/26* (2006.01)
*H04W 72/04* (2009.01)
*H04W 74/08* (2009.01)

(52) U.S. Cl.
CPC ....... *H04L 27/2613* (2013.01); *H04W 72/042* (2013.01); *H04W 72/0453* (2013.01); *H04W 74/0808* (2013.01)

MULTI-STAGE RECEIVER DESIGN COVERING LISTEN BEFORE TALK FAILURES

CROSS REFERENCE

The present application for patent claims the benefit of U.S. Provisional Patent Application No. 62/864,190 by NEGRO et al., entitled "A MULTI-STAGE RECEIVER DESIGN COVERING LISTEN BEFORE TALK FAILURES," filed Jun. 20, 2019, assigned to the assignee hereof, and which is hereby incorporated by reference in its entirety.

FIELD OF DISCLOSURE

The present disclosure, for example, relates to wireless communication systems, and more specifically to a multi-stage receiver design covering listen before talk failures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may support communication between base stations and UEs in an unlicensed radio frequency spectrum (also referred to as a shared radio frequency spectrum). Some wireless communications systems may use contention-based protocols to access an unlicensed radio frequency spectrum, as well as perform channel estimation processes for decoding and receiving information in the unlicensed radio frequency spectrum. As demand for UE efficiency increases however, some wireless communications systems may fail to provide improved channel estimations when operating in an unlicensed radio frequency spectrum, and therefore improved techniques are desired.

SUMMARY

The described techniques relate to improved methods, systems, devices, and apparatuses that support techniques related to channel estimation management for a user equipment (UE), and to reconfiguring channel estimation parameters according to unavailable radio frequency spectrum subbands in a bandwidth part (BWP). A BWP may be, for example, an 80 megahertz (MHz) BWP including multiple allocated radio frequency spectrum subbands, such as 20 MHz or 40 MHz radio frequency spectrum subbands of the 80 MHz BWP. In some examples, the UE may initially configure channel estimation parameters for each radio frequency spectrum subband of the BWP. To support improved power saving at the UE and, in some examples, efficient channel estimation the described techniques may include the UE identifying one or more unavailable radio frequency spectrum subbands (also referred to as unallocated radio frequency spectrum subbands) within the BWP, and reconfiguring one or more channel estimation parameters of the configured set of channel estimation parameters.

The UE may determine unavailable radio frequency spectrum subbands within the BWP prior to performing any channel estimations on the allocated radio frequency spectrum subbands (also referred to as available radio frequency spectrum subbands). Additionally, the described techniques may include the UE configuring a common set of channel estimation parameters for allocated radio frequency spectrum subbands, and setting log-likelihood ratio (LLR) values of subcarriers of the unavailable radio frequency spectrum subbands to a null value. The described techniques may as a result promote larger bandwidth blocks for channel estimation, while avoiding performing channel estimation on the unavailable radio frequency spectrum subbands. The described techniques may thus include features for improved UE energy saving and, in some examples, may promote higher channel estimation efficiencies, among other benefits.

A method of wireless communication at a UE is described. The method may include configuring a set of channel estimation parameters associated with a set of radio frequency spectrum subbands of a BWP in an unlicensed radio frequency spectrum band, identifying, in a transmission opportunity, at least one unavailable radio frequency spectrum subband of the set of radio frequency spectrum subbands within the BWP, and reconfiguring one or more channel estimation parameters of the configured set of channel estimation parameters based on the identifying.

An apparatus for wireless communication at a UE is described. The apparatus may include a processor, memory in electronic communication with the processor, and instructions stored in the memory. The instructions may be executable by the processor to cause the apparatus to configure a set of channel estimation parameters associated with a set of radio frequency spectrum subbands of a BWP in an unlicensed radio frequency spectrum band, identify, in a transmission opportunity, at least one unavailable radio frequency spectrum subband of the set of radio frequency spectrum subbands within the BWP, and reconfigure one or more channel estimation parameters of the configured set of channel estimation parameters based on the identifying.

Another apparatus for wireless communication at a UE is described. The apparatus may include means for configuring a set of channel estimation parameters associated with a set of radio frequency spectrum subbands of a BWP in an unlicensed radio frequency spectrum band, identifying, in a transmission opportunity, at least one unavailable radio frequency spectrum subband of the set of radio frequency spectrum subbands within the BWP, and reconfiguring one or more channel estimation parameters of the configured set of channel estimation parameters based on the identifying.

A non-transitory computer-readable medium storing code for wireless communication at a UE is described. The code may include instructions executable by a processor to configure a set of channel estimation parameters associated with a set of radio frequency spectrum subbands of a BWP in an unlicensed radio frequency spectrum band, identify, in a transmission opportunity, at least one unavailable radio frequency spectrum subband of the set of radio frequency spectrum subbands within the BWP, and reconfigure one or more channel estimation parameters of the configured set of channel estimation parameters based on the identifying.

Some examples of the method, apparatuses, and non-transitory computer-readable medium described herein may further include operations, features, means, or instructions for performing a channel estimation on allocated radio frequency spectrum subbands of the set of radio frequency spectrum subbands within the BWP based on the reconfigured one or more channel estimation parameters.

Some examples of the method, apparatuses, and non-transitory computer-readable medium described herein may further include operations, features, means, or instructions for determining, in the transmission opportunity, two or more allocated radio frequency spectrum subbands of the set of radio frequency spectrum subbands within the BWP, where the two or more allocated radio frequency spectrum bands may be contiguous and adjacent to the at least one unavailable radio frequency spectrum subband within the BWP, and where reconfiguring the one or more channel estimation parameters of the configured set of channel estimation parameters includes configuring a common set of channel estimation parameters for the two or more allocated radio frequency spectrum subbands.

Some examples of the method, apparatuses, and non-transitory computer-readable medium described herein may further include operations, features, means, or instructions for performing a channel estimation on the two or more allocated radio frequency spectrum subbands of the set of radio frequency spectrum subbands within the BWP based on the common set of channel estimation parameters for the two or more allocated radio frequency spectrum subbands.

Some examples of the method, apparatuses, and non-transitory computer-readable medium described herein may further include operations, features, means, or instructions for refraining from performing a channel estimation on the at least one unavailable radio frequency spectrum subband within the BWP.

In some examples of the method, apparatuses, and non-transitory computer-readable medium described herein, reconfiguring the one or more channel estimation parameters of the configured set of channel estimation parameters may include operations, features, means, or instructions for assigning a null value to one or more LLR values associated with one or more subcarriers of the at least one unavailable radio frequency spectrum subband within the BWP.

Some examples of the method, apparatuses, and non-transitory computer-readable medium described herein may further include operations, features, means, or instructions for receiving, from a base station, signaling to indicate at least one unavailable radio frequency spectrum subband of the set of radio frequency spectrum subbands within the BWP, where identifying, in the transmission opportunity, the at least one unavailable radio frequency spectrum subband of the set of radio frequency spectrum subbands within the BWP may be based on the signaling.

Some examples of the method, apparatuses, and non-transitory computer-readable medium described herein may further include operations, features, means, or instructions for receiving a grant including a resource allocation associated with the transmission opportunity, and identifying the set of radio frequency spectrum subbands of the BWP based on the resource allocation. In some examples of the method, apparatuses, and non-transitory computer-readable medium described herein, the grant may include an indication of the at least one unavailable radio frequency spectrum subband within the BWP.

In some examples of the method, apparatuses, and non-transitory computer-readable medium described herein, receiving the grant may include operations, features, means, or instructions for receiving downlink control information on a physical downlink control channel, the downlink control information including the resource allocation associated with the transmission opportunity and an indication of the at least one unavailable radio frequency spectrum subband within the BWP.

Some examples of the method, apparatuses, and non-transitory computer-readable medium described herein may further include operations, features, means, or instructions for receiving a reference signal prior to an initial slot of the transmission opportunity and measuring a signal quality associated with the reference signal, where identifying, in the transmission opportunity, the at least one unavailable radio frequency spectrum subband within the BWP may be based on the signal quality satisfying a threshold.

In some examples of the method, apparatuses, and non-transitory computer-readable medium described herein, the signal quality includes one or more of a signal to noise ratio (SNR), a signal to interference plus noise ratio (SINR), a reference signal received power (RSRP), a received signal strength indicator (RSSI), or a reference signal received quality (RSRQ). In some examples of the method, apparatuses, and non-transitory computer-readable medium described herein, the reference signal includes a wideband (WB) demodulation reference signal (DMRS). In some examples of the method, apparatuses, and non-transitory computer-readable medium described herein, each radio frequency spectrum subband of the set of radio frequency spectrum subbands of the BWP may have a separate set of channel estimation parameters.

DETAILED DESCRIPTION

Figure 1:
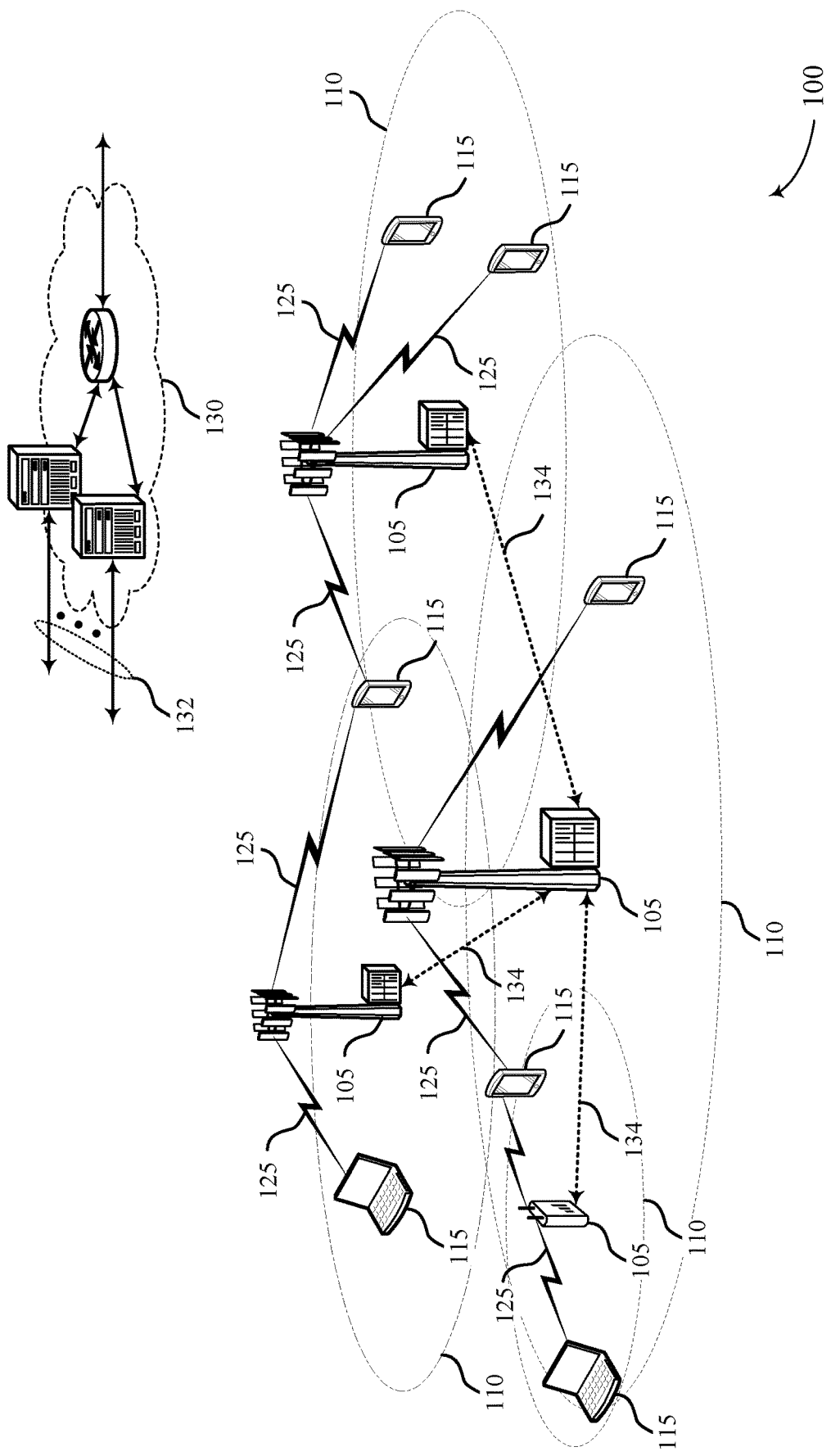
FIGS. 1 and 2 illustrate examples of a wireless communications system that supports a multi-stage receiver design covering listen before talk failures in accordance with various aspects of the present disclosure.

Some wireless communication systems may have one or more user equipments (UEs) and one or more base stations, for example, next-generation NodeBs or giga-NodeBs (either of which may be referred to as a gNB) that may support one or more multiple radio access technologies including 4G systems such as Long Term Evolution (LTE) systems, fifth generation (5G) systems which may be referred to as New Radio (NR) systems, and Wi-Fi systems (e.g., wireless local area network (WLAN) systems). According to one or more of these example radio access technologies, base stations and UEs may operate in an unlicensed radio frequency spectrum (also referred to as a shared radio frequency spectrum) or a licensed radio frequency spectrum (also referred to as unshared radio frequency spectrum). In a shared radio frequency spectrum, base stations and UEs may use contention-based procedures, for example, such as a listen before talk procedure to access an unlicensed radio frequency spectrum, as well as perform channel estimation for receiving and decoding transmissions in the unlicensed radio frequency spectrum. As demand for UE power management increases, it may be desirable for UEs to support capabilities for improved channel estimation management that may promote enhanced power conservation for the UE, and reduce latency in wireless communication systems.

As described herein, a UE may support channel estimation management schemes, and a channel estimation management scheme supporting reconfiguring channel estimation parameters according to one or more unavailable radio frequency spectrum subbands in a bandwidth part (BWP). In an example of an unlicensed spectrum NR system, a BWP may be greater than 20 megahertz (MHz), for example, such as 40 MHz or 80 MHz. The BWP may therefore include multiple radio frequency spectrum subbands (e.g., 20 MHz radio frequency spectrum subbands). The base station may transmit, to the UE, an indication of a BWP allocation (e.g., an 80 MHz BWP). For example, the base station may transmit a resource allocation including a BWP allocation.

The base station may perform a listen before talk procedure per radio frequency spectrum subband of the BWP, and transmit a transmission (e.g., control information or data) in a transmission opportunity (TxOP) on radio frequency spectrum subbands that clear the listen before talk procedure. One or more radio frequency spectrum subbands may, in some examples, fail the listen before talk procedure. As a result, the transmission from the base station may be discontinuous due to radio frequency spectrum subbands in the BWP that failed the listen before talk procedure. A failed listen before talk procedure may occur due to another device (e.g., a base station or a UE) using the one or more radio frequency spectrum subbands. The unavailable radio frequency spectrum subbands may therefore impact UE performance, and UE resources (e.g., power consumption).

The UE may configure channel estimation parameters per radio frequency spectrum subbands based on the received resource allocation (e.g., BWP allocation). In an example of an NR-U system, the UE may be unaware that one or more of the radio frequency spectrum subbands are unavailable in the BWP due to the listen before talk procedure failure. In some examples, an unavailable radio frequency spectrum subband may span an entire TxOP. The base station may determine to signal the UE existence of unavailable radio frequency spectrum subbands in the BWP, however, in some examples it may be unfeasible (e.g., due to insufficient time) to signal the UE. Therefore, the UE may initially be unaware of the unavailable radio frequency spectrum subbands during an initial slot of the TxOP, which may lead to degraded performance of channel estimation and throughput loss for the UE. Additionally, because the UE may be unaware of the unavailable radio frequency spectrum subbands, the UE may configure and perform multiple channel estimations in small bandwidth blocks to ensure a given channel estimation is not performed partially on allocated radio frequency spectrum subbands and partially on unavailable radio frequency spectrum subbands. Configuring extra channel estimation processes may lead to a loss in performance and increased power consumption for the UE compared to communication in a licensed radio frequency spectrum subband.

Techniques are described herein which may enable a UE to identify unavailable radio frequency spectrum subbands before performing channel estimation. The UE may as a result reconfigure channel estimation parameters for larger bandwidth blocks (e.g., multiple contiguous allocated radio frequency spectrum subbands), while avoiding performing channel estimation on unavailable radio frequency spectrum subbands. As part of reconfiguring the channel estimation processes, the UE may set log-likelihood ratio (LLR) values of subcarriers in the unavailable radio frequency spectrum subbands to a null value, in order to improve efficiency and reliability of channel estimation for the BWP. By setting the LLR values to a null value, the UE may bypass determining LLR values for the unavailable radio frequency spectrum subbands, as well as avoid unnecessarily using decoding resources on the unavailable radio frequency spectrum subbands.

In some examples, the UE may identify the unavailable radio frequency spectrum subbands based on signaling received from the base station. For example, the UE may identify the unavailable radio frequency spectrum subbands based on measuring a signal-to-noise ratio (SNR) of a signal transmitted by a base station at the beginning of a slot, where the signal may be a wideband demodulation reference signal (DMRS) for physical downlink control channel (PDCCH) channel estimation. In some examples, the base station may transmit a Wi-Fi preamble to the UE, which may include a short training field (STF), or a long training field (LTF), or both, to indicate an arriving data packet. The STF or the LTF may indicate the unavailable radio frequency spectrum subbands to the UE.

Aspects of the subject matter described herein may be implemented to realize one or more advantages. The described techniques may support improvements in power savings, among other advantages. As such, supported techniques may include improved UE operations and, in some examples, may promote UE efficiencies, among other benefits. For example, one or more integrated circuits (e.g., processors, memory coupled with processors, etc.) of the UE may implement the channel estimation parameter reconfiguration techniques discussed herein to reduce the overall complexity and processing requirements of the UE by setting LLR values for subcarriers in unavailable radio frequency spectrum subbands to null values. Aspects of the disclosure are initially described in the context of wireless communications system. Additional examples of a channel estimation process and a process flow are then discussed. Aspects of the disclosure are further illustrated by and described with reference to apparatus diagrams, system diagrams, and flowcharts that relate to multi-stage receiver design covering listen before talk failures.

FIG. 1 illustrates an example of a wireless communications system 100 that supports a multi-stage receiver design covering listen before talk failures in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. The wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in the wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and the wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations

105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some examples, various functions of each access network entity or base station 105 may be distributed across various network devices (e.g., radio heads and access network controllers) or consolidated into a single network device (e.g., a base station 105).

The wireless communications system 100 may operate using one or more frequency bands, which may be in the range of 300 MHz to 300 gigahertz (GHz). For example, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. The wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

The wireless communications system 100 may also operate in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the wireless communications system 100 may utilize both licensed and unlicensed radio frequency spectrum bands. For example, the wireless communications system 100 may employ License Assisted Access (LAA), unlicensed radio frequency spectrum band access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, the wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at orientations with respect to an antenna array experience constructive interference while others experience destructive interference. The adjustment of signals communicated via the antenna elements may include a transmitting device or a receiving device applying one or more amplitude and phase offsets to signals carried via each of the antenna elements associated with the device. The adjustments associated with each of the antenna elements may be defined by a beamforming weight set associated with an orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, the wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth. The wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, the wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

The wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 (e.g., a gNB in an NR system) may determine a resource allocation for downlink transmissions to a UE 115 in a TxOP. The base station 105 may configure a BWP (e.g., an 80 MHz BWP) composed of multiple radio frequency spectrum subbands (e.g., four 20 MHz subbands) for the resource allocation. In some examples, such as when the BWP is in an unlicensed radio frequency spectrum band, the base station 105 may perform respective listen before talk procedures for each radio frequency spectrum subband in the configured BWP, to ensure the radio frequency spectrum subband is clear before transmitting data. The base station 105 may determine to allocate downlink transmissions to radio frequency spectrum subbands that pass the respective listen before talk procedures for downlink transmissions, and avoid allocating downlink transmissions to unavailable radio frequency spectrum subbands (e.g., that fail the respective listen before talk procedures). The base station 105 may refrain from transmitting on the unavailable radio frequency spectrum subbands throughout the TxOP, until the base station 105 determines a new resource allocation for a new TxOP.

The UE 115 may receive the resource allocation from a base station 105, for example via downlink control information (DCI) in a physical downlink control channel (PDCCH). The UE 115 may be unaware of the unavailable radio frequency spectrum subbands in the BWP for a first slot of the TxOP. In some examples, the base station 105 may transmit signaling to the UE 115 that indicates the unavailable radio frequency spectrum subbands for subsequent slots in the TxOP, but the UE 115 may not receive the signaling before the first slot of the TxOP. Because the UE 115 may not be aware of the unavailable radio frequency spectrum subbands in the BWP, the UE 115 may initially configure respective channel estimation processes for each subband in the configured BWP. The UE 115 may identify the unavailable radio frequency spectrum subbands before performing channel estimation. Based on identifying the unavailable radio frequency spectrum subbands, the UE 115 may reconfigure channel estimation parameters for larger bandwidth blocks (e.g., multiple contiguous allocated radio frequency spectrum subbands) while evading performing channel estimation on unavailable radio frequency spectrum subbands. The wireless communications system 100 may therefore include features for improved power savings and, in some examples, may promote improved channel estimation efficiencies, among other benefits.

Figure 2:
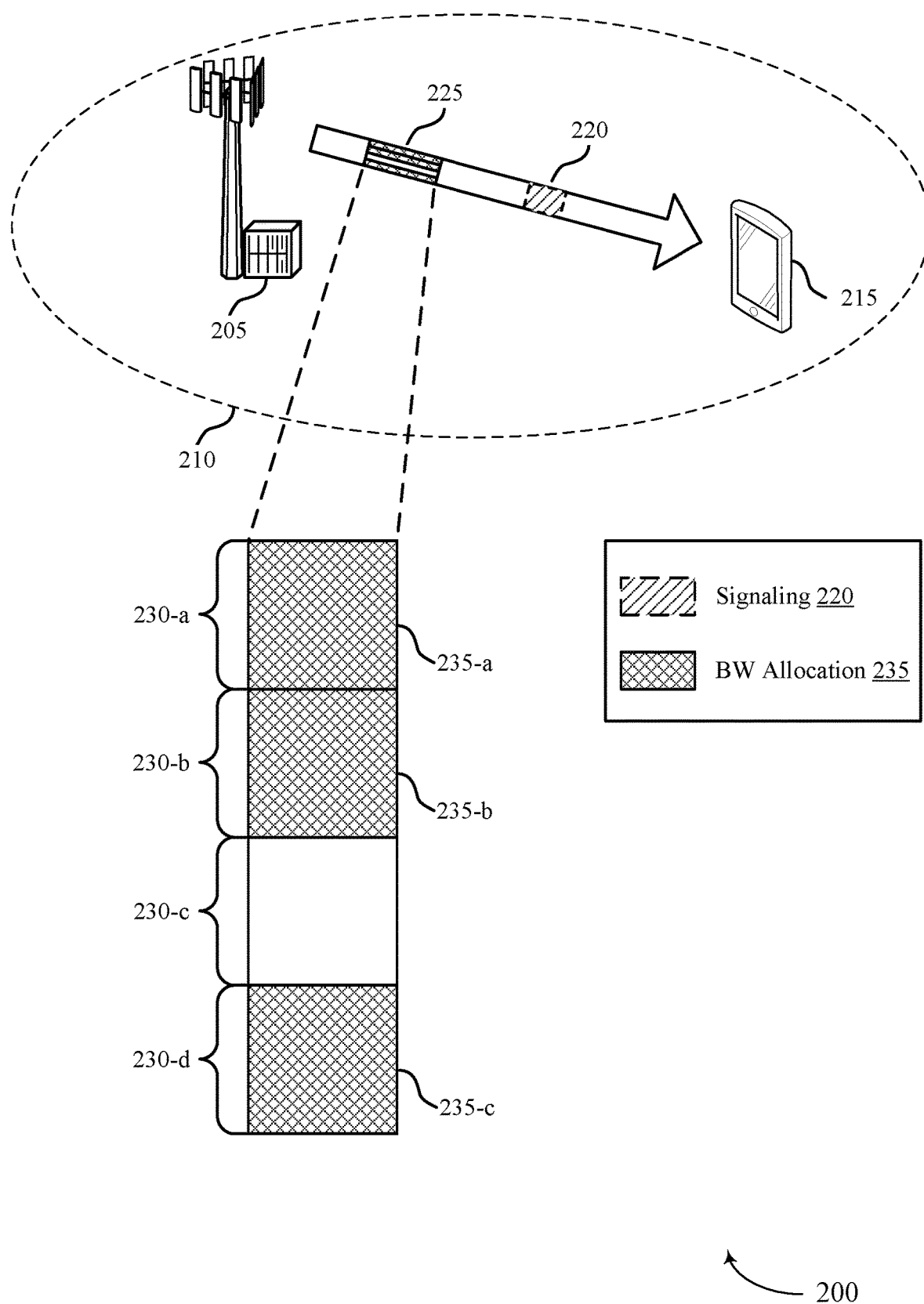

FIG. 2 illustrates an example of a wireless communications system 200 that supports a multi-stage receiver design covering listen before talk failures in accordance with various aspects of the present disclosure. In some examples, the wireless communications system 200 may implement aspects of the wireless communications system 100. For example, the wireless communications system 200 may include a base station 205 and a UE 215, which may be examples of the corresponding devices described with reference to FIG. 1. The wireless communications system 200 may include features for improved UE operations and, in some examples, may promote higher UE efficiencies, among other benefits.

In the wireless communications system 200, the base station 205 may provide a geographic coverage area 210. The base station 205 may configure a BWP 225 for downlink transmissions to the UE 215 in a TxOP. In the example illustrated in FIG. 2, the BWP 225 may include four radio frequency spectrum subbands 230, and may be in an unlicensed radio frequency spectrum band. The base station 205 may perform respective contention-based procedures (e.g., a listen before talk procedure) for each radio frequency spectrum subband 230. In some examples, when a listen before talk procedure indicates a radio frequency spectrum subband 230 is available (e.g., "clear" for use), the base station 205 may assign a bandwidth allocation 235 for downlink transmissions on the radio frequency spectrum subband 230. In some other examples, when a listen before talk procedure indicates a radio frequency spectrum subband 230 is not available (e.g., that the radio frequency spectrum subband 230 is in use or reserved by another device), the base station 205 may be prevented from using and assigning a bandwidth allocation 235 for downlink transmissions on the radio frequency spectrum subband 230. The base station 205 may, in some examples, perform a listen before talk procedure for some radio frequency spectrum subbands 230 but not all of the radio frequency spectrum subbands 230.

In the example illustrated in FIG. 2, the respective listen before talk procedures for the radio frequency spectrum subband 230-a, the radio frequency spectrum subband 230-b, and the radio frequency spectrum subband 230-d may pass, while the respective listen before talk procedure for the radio frequency spectrum subband 230-c may fail. As a result, the base station 205 may assign the bandwidth allocation 235-a, the bandwidth allocation 235-b, and the bandwidth allocation 235-a to the radio frequency spectrum subband 230-a, the radio frequency spectrum subband 230-b, and the radio frequency spectrum subband 230-d, respectively, and the base station 205-a may avoid allocating downlink transmissions to the radio frequency spectrum subband 230-c, which the base station may determine is unavailable.

The base station 205 may transmit signaling 220 to the UE 215 indicating that the radio frequency spectrum subband 230-c is unavailable. The UE 215 may identify the BWP 225 for receiving downlink transmissions from the base station 205 in the TxOP. In some examples, the UE 215 may identify the BWP 225 based on receiving the signaling 220 from the base station 205. The UE 215 may configure respective channel estimation parameters for performing channel estimation on each radio frequency spectrum subband 230 of the BWP 225. For example, the UE 215 may identify that the radio frequency spectrum subband 230-c of the BWP 225 is unavailable, based on the signaling 220 received from the base station 205. Based on identifying that the radio frequency spectrum subband 230-c is unavailable, the UE 215 may reconfigure channel estimation parameters for performing channel estimation. For example, the UE 215 may reconfigure the channel estimation parameters for performing channel estimation for bandwidth blocks larger than a single radio frequency spectrum subband 230. In some examples, the UE 215 may identify that multiple contiguous radio frequency spectrum subbands 230 include bandwidth allocations 235, such as the radio frequency spectrum subband 230-a and the radio frequency spectrum subband 230-b. By performing channel estimation processes for larger bandwidth blocks, the UE 215 may improve efficiency and reliability of channel estimation. In some examples, the UE 215 may additionally set LLR values for subcarriers in the radio frequency spectrum subband 230-c to a null value based on identifying that the radio frequency spectrum subband 230-c is unavailable.

Figure 3:
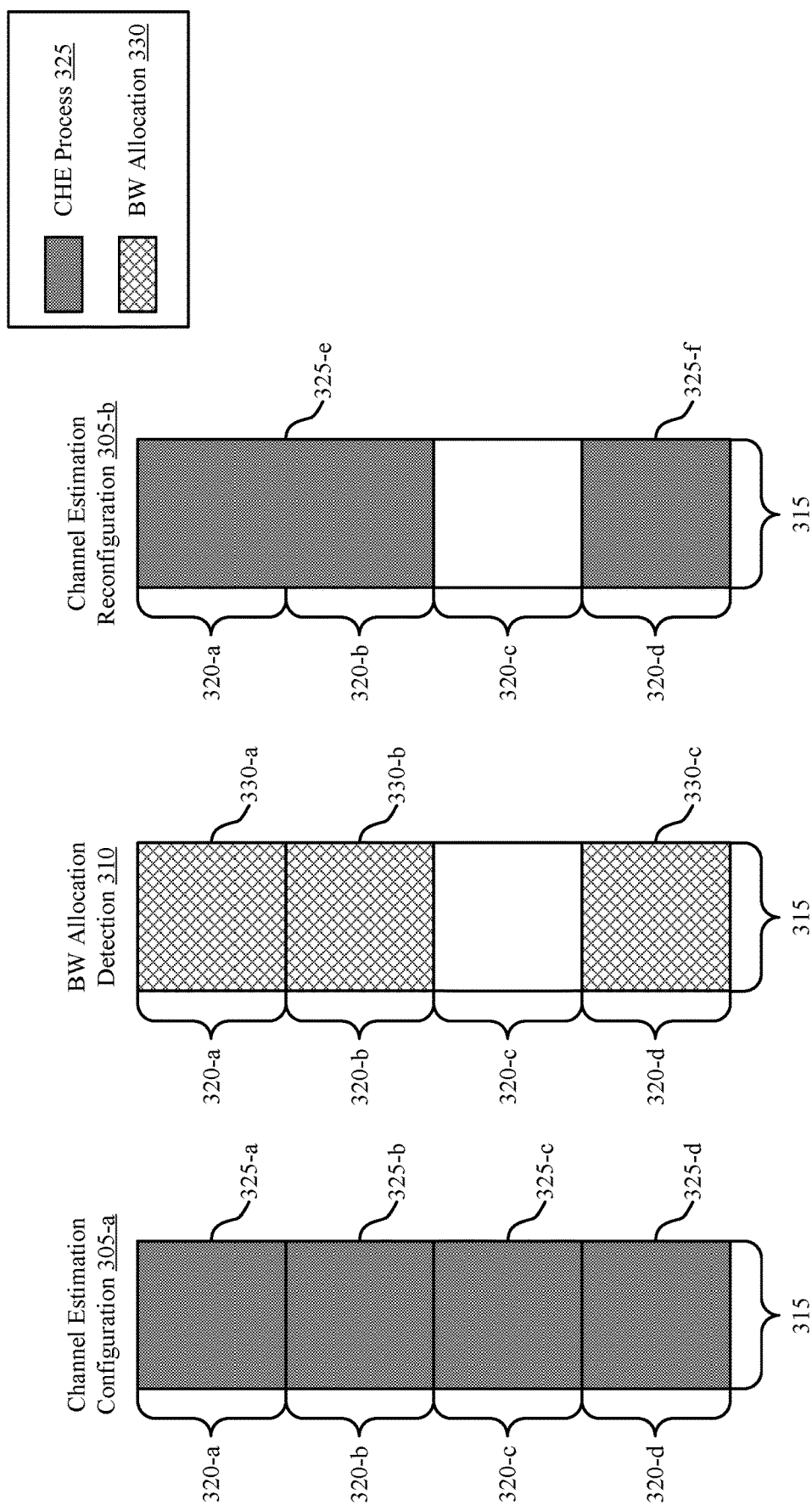
FIG. 3 illustrates an example of a channel estimation process that supports a multi-stage receiver design covering listen before talk failures in accordance with various aspects of the present disclosure.

FIG. 3 illustrates an example of a channel estimation process 300 that supports a multi-stage receiver design covering listen before talk failures in accordance with various aspects of the present disclosure. In some examples, the channel estimation process 300 may implement aspects of the wireless communications system 100 and wireless communications system 200. The channel estimation process 300 may be associated with a UE, which may be an example of corresponding devices described with reference to FIGS. 1 and 2. The channel estimation process 300 may include features for improved UE operations and, in some examples, may promote higher UE efficiencies, among other benefits.

A UE may identify a BWP 315 configured for downlink transmissions from a base station in a TxOP. The BWP 315 may include one or more radio frequency spectrum subbands 320. In the example illustrated in FIG. 3, the BWP 315 may include four radio frequency spectrum subbands 320. In some examples, a UE may identify the BWP 315 based on receiving signaling from the base station. With reference to channel estimation configuration 305-a, a UE may initially configure respective channel estimation parameters for performing the channel estimation processes 325 on each radio frequency spectrum subband 320 of the BWP 315. As illustrated in FIG. 3, a UE may configure a channel estimation process 325-a for a radio frequency spectrum subband 320-a, a channel estimation process 325-b for a radio frequency spectrum subband 320-b, a channel estimation process 325-c for a radio frequency spectrum subband 320-c, and a channel estimation process 325-d for a radio frequency spectrum subband 320-c.

With reference to bandwidth allocation detection 310, a UE may identify bandwidth allocations 330 of the BWP 315. In the example illustrated in FIG. 3, a UE may identify a bandwidth allocation 330-a in the radio frequency spectrum subband 320-a, a bandwidth allocation 330-b in the radio frequency spectrum subband 320-b, and a bandwidth allocation 330-c in the radio frequency spectrum subband 320-d, respectively. Additionally, the UE may identify that the subband 320-c of the BWP 315 is unavailable. The radio frequency spectrum subband 320-c may be unavailable based on the radio frequency spectrum subband 320-c failing a listen before talk procedure performed by a base station, and so the base station may determine not to assign a bandwidth allocation 330 to the radio frequency spectrum subband 320-c.

With reference to channel estimation reconfiguration 305-b, a UE may reconfigure channel estimation parameters for performing channel estimation processes 325 on the radio frequency spectrum subbands 320 of the BWP 315. For example, a UE may reconfigure the channel estimation parameters based on identifying the bandwidth allocations 330 and the unavailable radio frequency spectrum subbands 320 (for example, in the bandwidth allocation detection 310). For example, a UE may reconfigure the channel estimation parameters for performing channel estimation processes 325 for bandwidth blocks larger than a single radio frequency spectrum subband 320, where the UE identifies multiple contiguous radio frequency spectrum subbands 320 including bandwidth allocations 330.

In the example illustrated in FIG. 3, a UE may configure a channel estimation process 325-e for performing channel estimation on both the radio frequency spectrum subband 320-a and the radio frequency spectrum subband 320-b collectively. For example, a UE may reconfigure the channel estimation process 325-a and the channel estimation process 325-b to be the channel estimation process 325-e. As such, the UE may jointly perform the channel estimation process 325-f on both the radio frequency spectrum subband 320-a and the radio frequency spectrum subband 320-b. In some examples, the UE may additionally configure a channel estimation process 325-f for the radio frequency spectrum subband 320-d. In some examples, the channel estimation process 325-f may be the channel estimation process 325-d. By configuring the channel estimation processes 325 for larger bandwidth blocks, a UE may improve efficiency and reliability of channel estimation. In some examples, a UE may additionally set LLR values for subcarriers in the radio frequency spectrum subband 320-c to a null value based on identifying that the radio frequency spectrum subband 320-c is unavailable.

Figure 4:
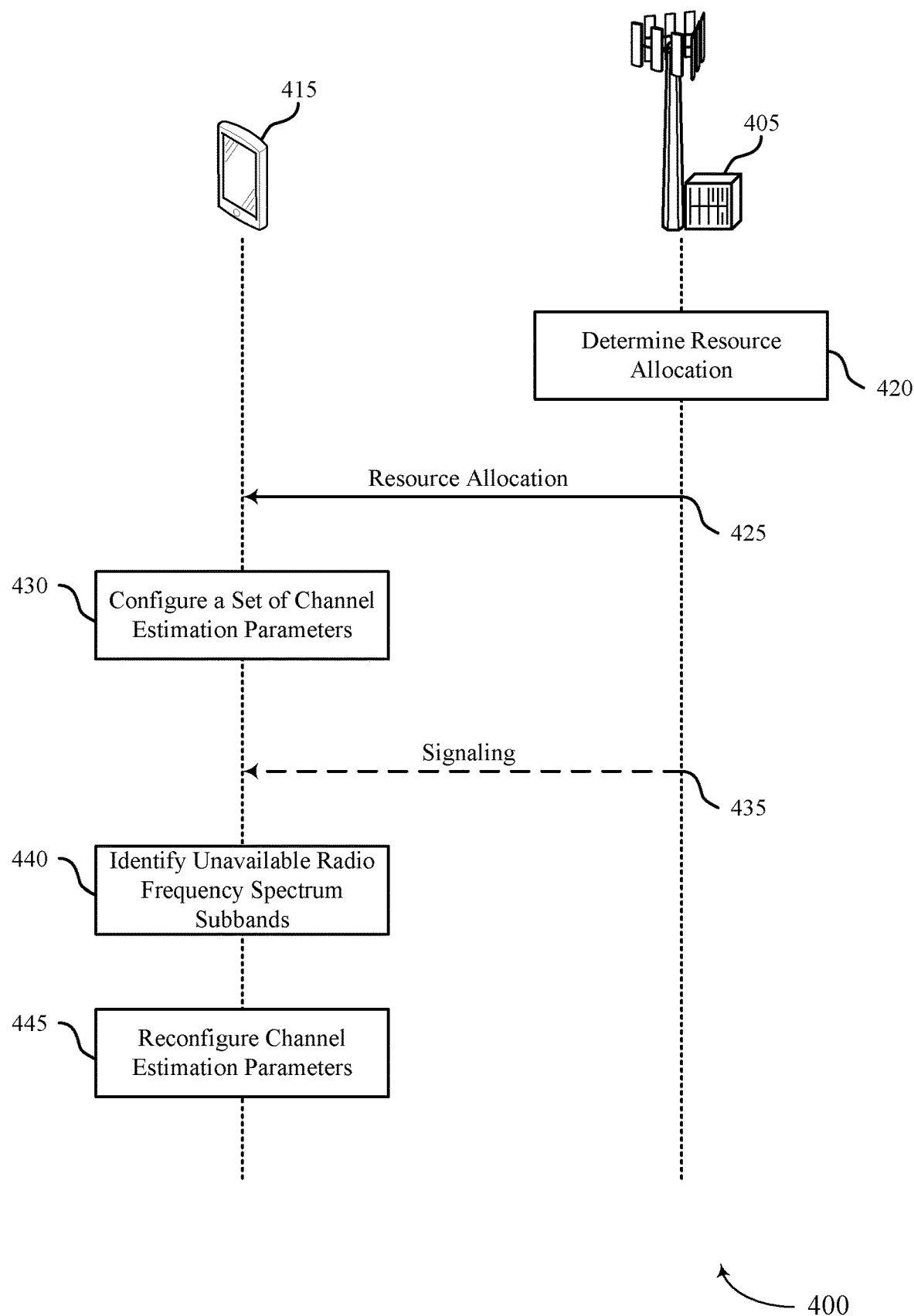
FIG. 4 illustrates an example of a process flow that supports a multi-stage receiver design covering listen before talk failures in accordance with various aspects of the present disclosure.

FIG. 4 illustrates an example of a process flow 400 that supports a multi-stage receiver design covering listen before talk failures in accordance with various aspects of the present disclosure. In some examples, the process flow 400 may implement aspects of the wireless communications system 100 and wireless communications system 200, as described with reference to FIGS. 1 and 2. For example, the process flow 400 may include a base station 405 and a UE 415, which may be examples of the corresponding devices described with reference to FIGS. 1 and 2. In the following description of the process flow 400, the operations between the base station 405 and the UE 415 may be transmitted in a different order than the example order shown, or the operations performed by the base station 405 and the UE 415 may be performed in different orders or at different times. Some operations may also be omitted from the process flow 400, and other operations may be added to the process flow 400. The operations performed by the base station 405 and the UE 415 may support improvement to the UE 415 channel estimation operations and, in some examples, may promote improvements to the UE 415 reliability, among other benefits.

At 420, the base station 405 may determine a resource allocation including a set of radio frequency spectrum subbands of a BWP in an unlicensed radio frequency spectrum band. For example, the base station 405 may allocate time and frequency resources associated with the set of radio frequency spectrum subbands. In some examples, a time and frequency resource may include a resource element, which may span one symbol by one subcarrier. The base station 405 may configure a BWP according to the resource allocation, for example, including multiple symbols and subcarriers (i.e., a physical resource blocks). In some examples, the base station 405 may configure a BWP that may include a contiguous set of time and frequency resources (e.g., multiple physical resource blocks). For example, a BWP may be 20 MHz, 40 MHz, or 80 MHz occupying multiple physical resource blocks. In an example where the BWP is 80 MHz, each radio frequency spectrum subband of the set of radio frequency spectrum subbands may occupy 20 MHz or 40 MHz of the 80 MHz BWP.

At 425, the base station 405 may transmit, to the UE 415, signaling including the resource allocation. The signaling may be an uplink grant carrying information of the resource allocation, for example, the base station 405 may transmit an uplink grant to the UE 415 via control signaling, such as a PDCCH carrying a DCI including the uplink grant. In some examples, a DCI may have different DCI formats, and therefore may in some examples carry various additional information. For example, a first DCI format may carry information of the resource allocation (e.g., a set of radio frequency spectrum subbands of a BWP), while a second DCI format may carry the information of the resource allocation, as well as additional information, such as unavailable radio frequency spectrum subbands associated with the resource allocation, a modulation and coding scheme (MCS), among others. In some examples, the base station 405 may transmit, to the UE 415, the second DCI format in response to determining one or more unavailable radio frequency spectrum subbands based on a failure of a listen before talk procedure on the one or more unavailable radio frequency spectrum subbands prior to an initial slot of a TxOP for the UE 415. In the example of FIG. 4, the base station 405 and the UE 415 may operate in an unlicensed radio frequency spectrum, and therefore the base station 405 and the UE 415 may employ listen before talk procedures to ensure radio frequency spectrum subbands are available before communicating on the radio frequency spectrum subbands. The base station 405 and the UE 415 may thus use radio frequency spectrum subbands in an unlicensed radio frequency spectrum band that clear a respective listen before talk procedure, and refrain from using radio frequency spectrum subbands that fail the respective listen before talk procedures.

At 430, the UE 415 may configure a set of channel estimation parameters. In some examples, unavailable radio frequency spectrum subbands in a BWP may be unknown to the UE 415, and therefore may configure respective channel estimation parameters to perform channel estimation on each radio frequency spectrum subband of the BWP. For example, the UE 415 may configure a set of channel estimation parameters based on the resource allocation, for example, the set of radio frequency spectrum subbands of the BWP. In an example, the UE 415 may configure a separate set of channel estimation parameters for each radio frequency spectrum subband of the set of radio frequency spectrum subbands of the BWP. For example, the UE 415 may configure a first set of channel estimation parameters for a first radio frequency spectrum subband (e.g., 20 MHz), a second set of channel estimation parameters for a second radio frequency spectrum subband (e.g., 20 MHz), and the like of the 80 MHz BWP.

In the example of FIG. 4, the UE 415 may identify unavailable radio frequency spectrum subbands of the set of radio frequency spectrum subbands within the BWP to reduce power consumption and increase channel estimation reliability. By way of example, at 435, the base station 405 may optionally transmit, to the UE 415, signaling that may enable the UE 415 to identify unavailable radio frequency spectrum subbands within the BWP. In some examples, the signaling may include the base station 405 transmitting a reference signal prior to an initial slot of a TxOP for the UE 415. For example, the base station 405 may transmit a WB DMRS, which the UE 415 may receive and measure a signal quality of the WB DMRS. In some examples, the signal quality may be an SNR, an SINR, an RSRP, an RSSI, or an RSRQ, or any combination thereof. In some other examples, the signaling may include the base station 405 transmitting a Wi-Fi preamble, which may include one or more of an STF or an LTF to indicate an arriving data packet. Here, the UE 415 may receive the Wi-Fi preamble and identify unavailable radio frequency spectrum subbands based on an indication in one or more of the ST or the LTE. At 440, the UE 415 may identify unavailable radio frequency spectrum subbands. In some examples, the UE 415 may identify unavailable radio frequency spectrum subbands based on the signaling or the uplink grant from the base station 405. By way of example, the UE 415 may identify unavailable radio frequency spectrum subbands based on the signal quality of measured reference signal, for example, WB DMRS satisfying a threshold (e.g., an SNR threshold, an SINR threshold, an RSRP threshold, an RSSI threshold, or an RSRQ threshold, or any combination thereof).

At 445, the UE 415 may reconfigure channel estimation parameters, for example, based on the identified unavailable radio frequency spectrum subbands. In some examples, reconfiguring the channel estimation parameters may allow the UE 415 to improve channel estimation efficiency by performing channel estimation on larger bandwidth blocks (e.g., multiple contiguous allocated subbands (e.g., a combined radio frequency spectrum subband), while avoiding performing channel estimation on the unavailable radio frequency spectrum subbands. In some examples, reconfiguring the channel estimation parameters may include the UE 415 setting one or more LLR values of subcarriers associated with the unavailable radio frequency spectrum subbands to a null value. By setting the LLR values to a null value, the UE 415 may avoid determining LLR values for unavailable radio frequency spectrum subbands, and the UE 415 may avoid using decoding resources on the unavailable radio frequency spectrum subbands. The operations performed by the base station 405 and the UE 415 may therefore support improvement to the UE 415 channel estimation operations and, in some examples, may promote improvements to the UE 415 reliability, among other benefits.

Figure 5:
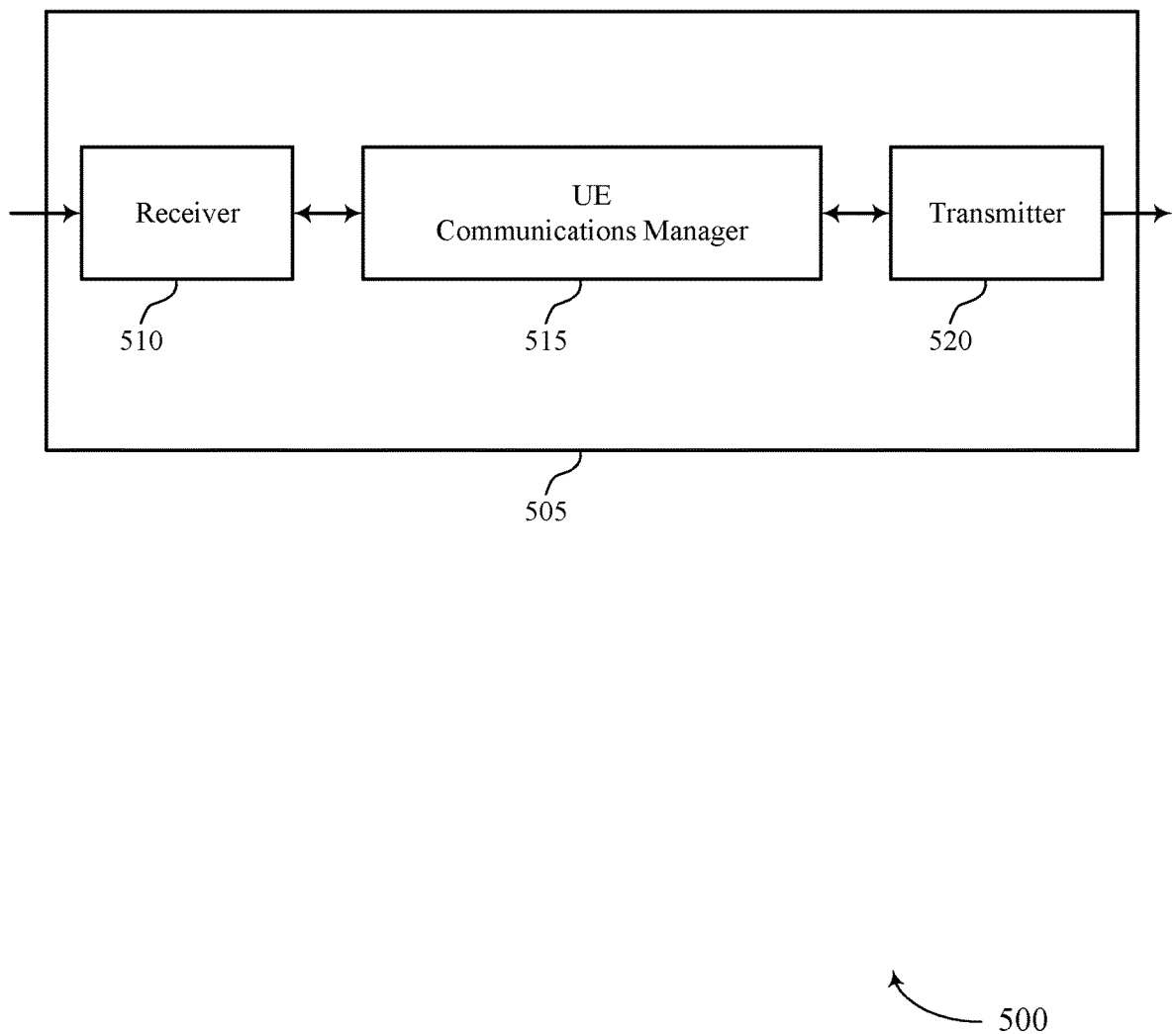
FIGS. 5 and 6 show block diagrams of devices that support a multi-stage receiver design covering listen before talk failures in accordance with various aspects of the present disclosure.

FIG. 5 shows a block diagram 500 of a device 505 that supports a multi-stage receiver design covering listen before talk failures in accordance with various aspects of the present disclosure. The device 505 may be an example of aspects of a UE 115 (as shown in FIG. 1) as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to multi-stage receiver design covering listen before talk failures, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may configure a set of channel estimation parameters associated with a set of radio frequency spectrum subbands of a BWP in an unlicensed radio frequency spectrum band, identify, in a TxOP, at least one unavailable radio frequency spectrum subband of the set of radio frequency spectrum subbands within the BWP, and reconfigure one or more channel estimation parameters of the configured set of channel estimation parameters based on the identifying.

The UE communications manager 515 as described herein may be implemented to realize one or more potential advantages. One implementation may allow the device 505 to save power and increase battery life by communicating with a base station 105 (as shown in FIG. 1) more efficiently. For example, the device 505 may efficiently obtain information transmitted by a base station 105 in a BWP, as the device 505 may be able to reconfigure channel estimation processes to avoid unnecessary channel estimation processes on unavailable radio frequency spectrum subbands. Another implementation may promote low latency communications at the device 505, as a number of resources allocated to channel estimation may be reduced. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
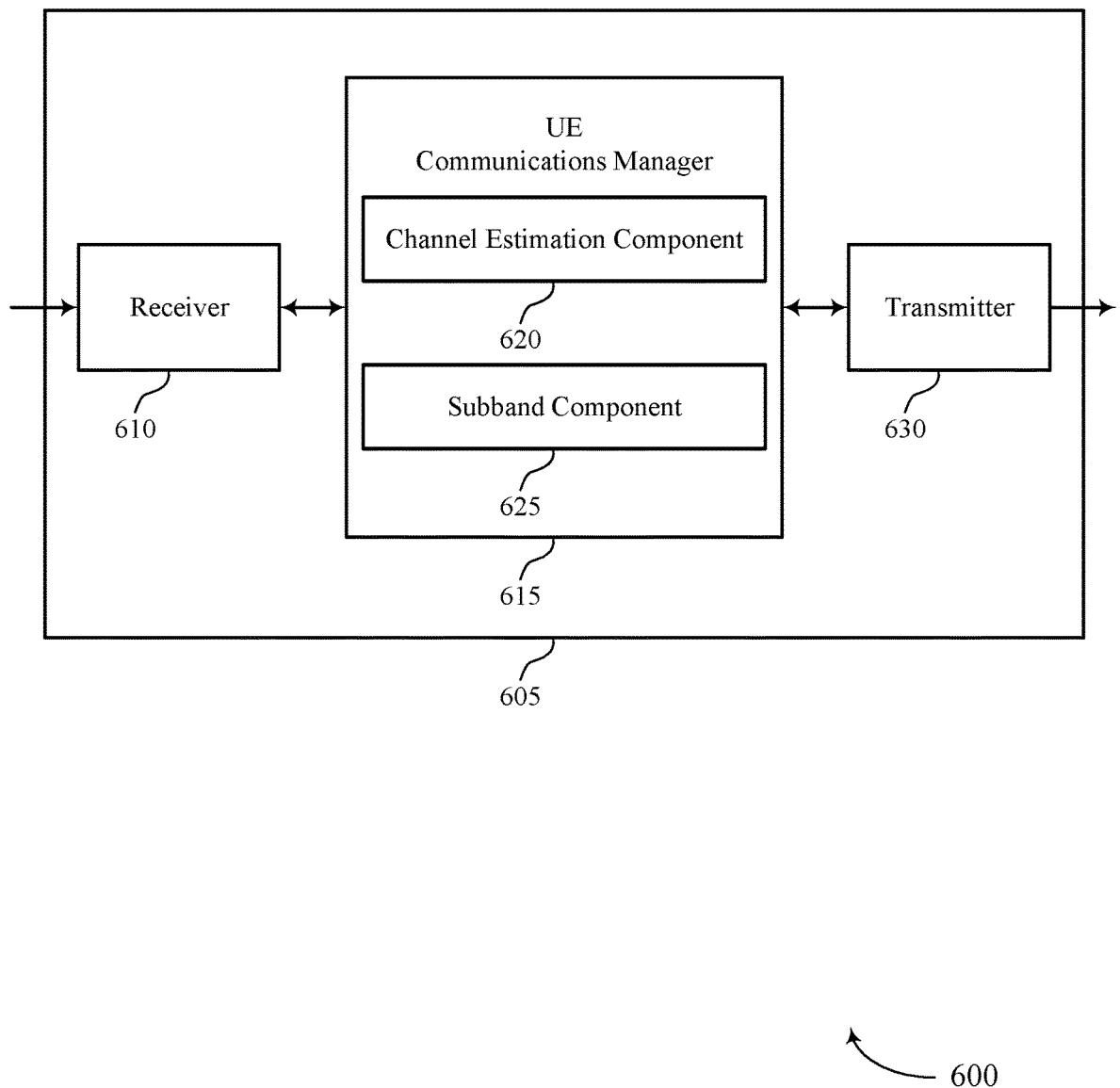

FIG. 6 shows a block diagram 600 of a device 605 that supports a multi-stage receiver design covering listen before talk failures in accordance with various aspects of the present disclosure. The device 605 may be an example of aspects of a device 505 (as shown in FIG. 5), or a UE 115 (as shown in FIG. 1) as described herein. The device 605 may include a receiver 610, a UE communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to multi-stage receiver design covering listen before talk failures, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a channel estimation component 620 and a subband component 625. The UE communications manager 615 may be an example of aspects of the UE communications manager 810 described herein.

The channel estimation component 620 may configure a set of channel estimation parameters associated with a set of radio frequency spectrum subbands of a BWP in an unlicensed radio frequency spectrum band. The subband component 625 may identify, in a TxOP, at least one unavailable radio frequency spectrum subband of the set of radio frequency spectrum subbands within the BWP. The channel estimation component 620 reconfigure one or more channel estimation parameters of the configured set of channel estimation parameters based on the identifying.

The transmitter 630 may transmit signals generated by other components of the device 605. In some examples, the transmitter 630 may be collocated with a receiver 610 in a transceiver component. For example, the transmitter 630 may be an example of aspects of the transceiver 820 described with reference to FIG. 8. The transmitter 630 may utilize a single antenna or a set of antennas.

Figure 7:
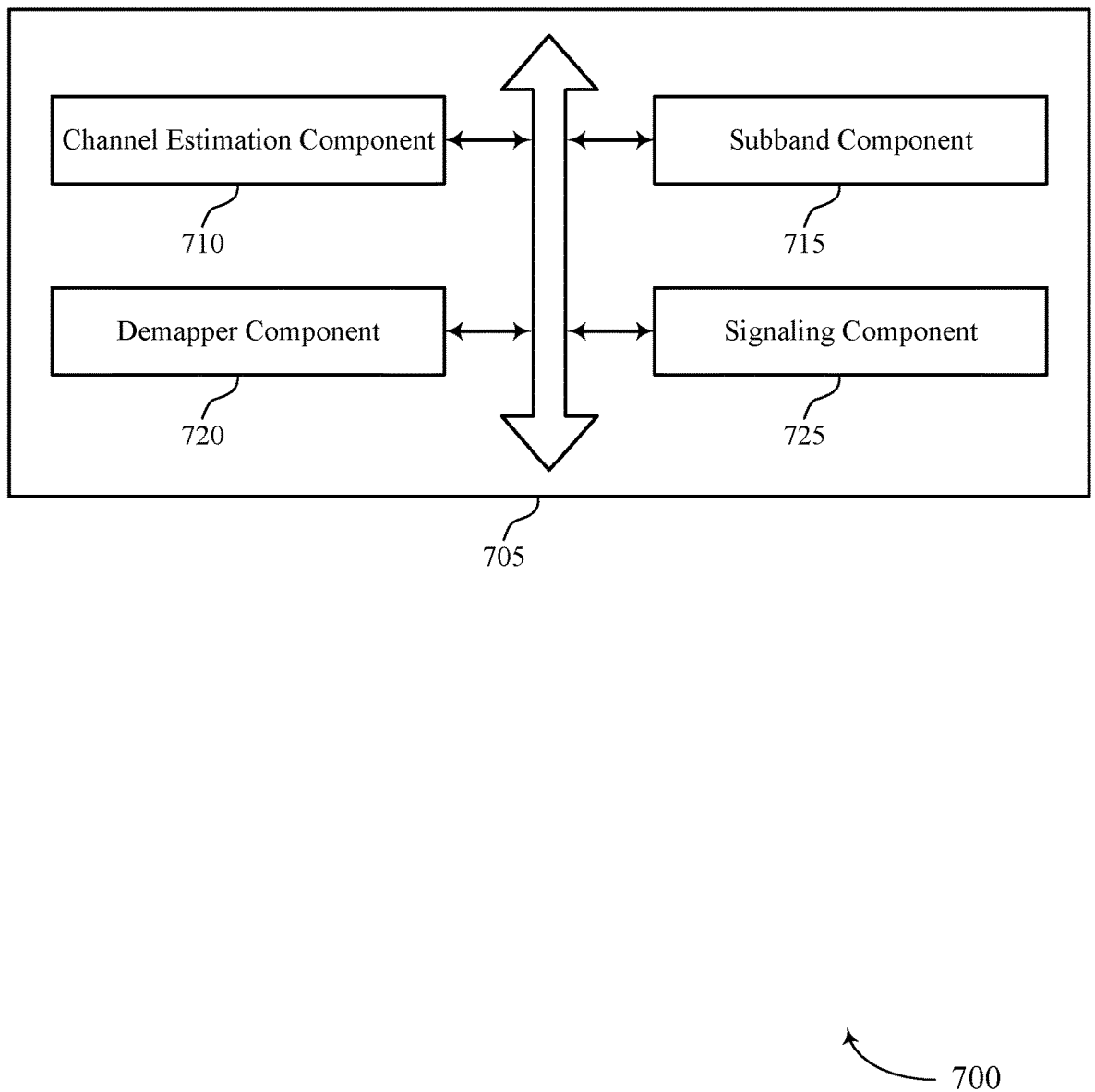
FIG. 7 shows a block diagram of a UE communications manager that supports a multi-stage receiver design covering listen before talk failures in accordance with various aspects of the present disclosure.
Figure 8:
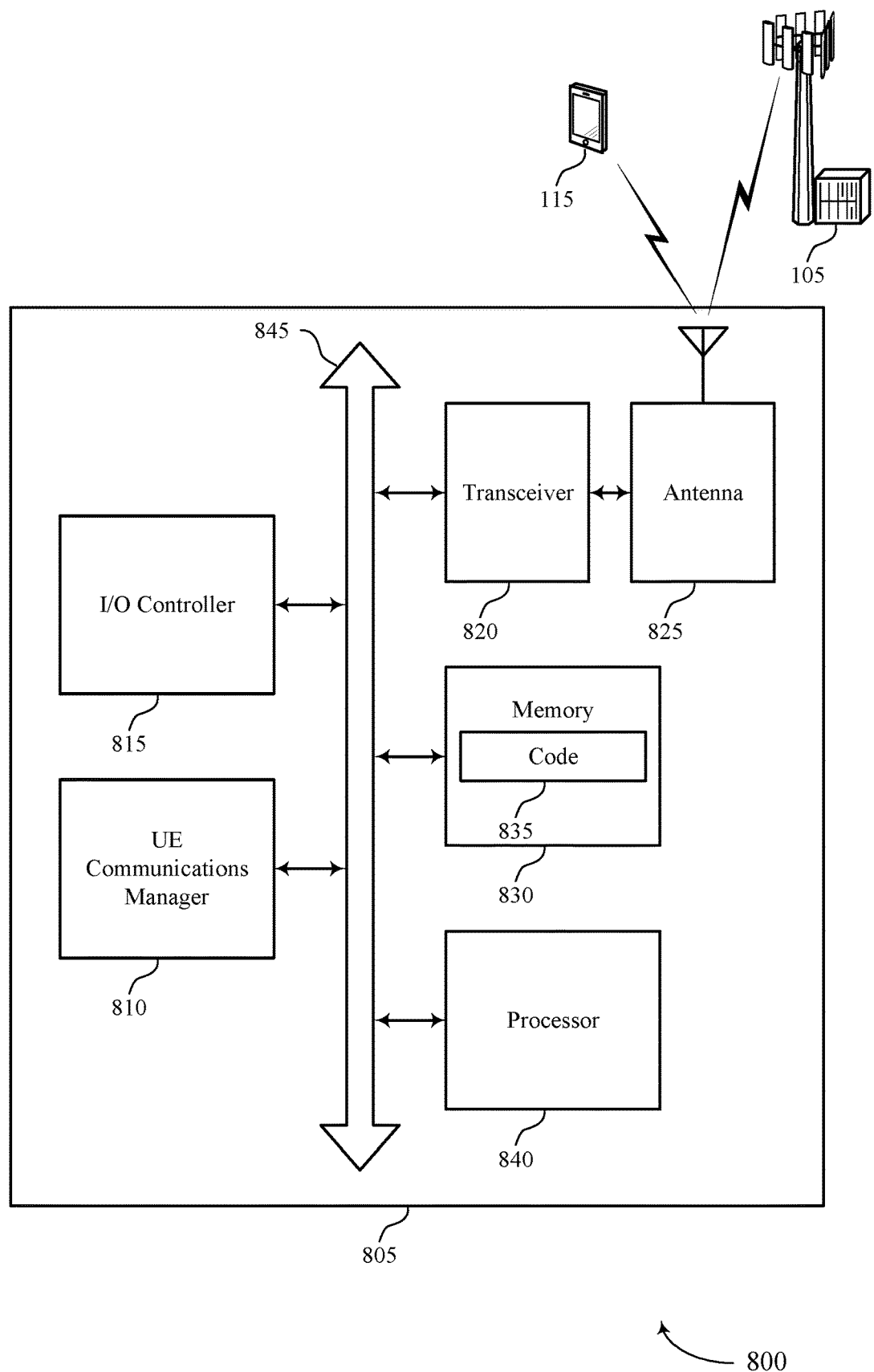
FIG. 8 shows a diagram of a system including a device that supports a multi-stage receiver design covering listen before talk failures in accordance with various aspects of the present disclosure.

FIG. 7 shows a block diagram 700 of a UE communications manager 705 that supports a multi-stage receiver design covering listen before talk failures in accordance with various aspects of the present disclosure. The UE communications manager 705 may be an example of aspects of a UE communications manager 515 (as shown in FIG. 5), a UE communications manager 615 (as shown in FIG. 6), or a UE communications manager 810 (as shown in FIG. 8) described herein. The UE communications manager 705 may include a channel estimation component 710, a subband component 715, a demapper component 720, and a signaling component 725. Each of these components may communicate, directly or indirectly, with one another (e.g., via one or more buses).

The channel estimation component 710 may configure a set of channel estimation parameters associated with a set of radio frequency spectrum subbands of a BWP in an unlicensed radio frequency spectrum band. In some examples, the channel estimation component 710 may reconfigure one or more channel estimation parameters of the configured set of channel estimation parameters based on the identifying. In some examples, the channel estimation component 710 may perform a channel estimation on allocated radio frequency spectrum subbands of the set of radio frequency spectrum subbands within the BWP based on the reconfigured one or more channel estimation parameters. In some cases, each radio frequency spectrum subband of the set of radio frequency spectrum subbands of the BWP has a separate set of channel estimation parameters.

In some examples, reconfiguring the one or more channel estimation parameters of the configured set of channel estimation parameters includes configuring a common set of channel estimation parameters for the two or more allocated radio frequency spectrum subbands. The channel estimation component 710 may perform a channel estimation on the two or more allocated radio frequency spectrum subbands of the set of radio frequency spectrum subbands within the BWP based on the common set of channel estimation parameters for the two or more allocated radio frequency spectrum subbands. In some examples, the channel estimation component 710 may refrain from performing a channel estimation on the at least one unavailable radio frequency spectrum subband within the BWP.

The subband component 715 may identify, in a TxOP, at least one unavailable radio frequency spectrum subband of the set of radio frequency spectrum subbands within the BWP. In some examples, the subband component 715 may determine, in the TxOP, two or more allocated radio frequency spectrum subbands of the set of radio frequency spectrum subbands within the BWP. In some examples, the two or more allocated radio frequency spectrum bands may be contiguous and adjacent to the at least one unavailable radio frequency spectrum subband within the BWP. In some examples, the subband component 715 may identify, in the TxOP, the at least one unavailable radio frequency spectrum subband of the set of radio frequency spectrum subbands within the BWP based on signaling. In some examples, the subband component 715 may identify the set of radio frequency spectrum subbands of the BWP based on resource allocation. In some examples, the subband component 715 may determine, in the TxOP, the at least one unavailable radio frequency spectrum subband within the BWP based on a signal quality satisfying a threshold.

The demapper component 720 may assign a null value to one or more LLR values associated with one or more subcarriers of the at least one unavailable radio frequency spectrum subband within the BWP. The signaling component 725 may receive, from a base station, the signaling to indicate at least one unavailable radio frequency spectrum subband of the set of radio frequency spectrum subbands within the BWP. In some examples, the signaling component 725 may receive a grant including the resource allocation associated with the TxOP. In some examples, the signaling component 725 may receive DCI on a PDCCH, the DCI may include the resource allocation associated with the TxOP and an indication of the at least one unavailable radio frequency spectrum subband within the BWP. In some examples, the signaling component 725 may receive a reference signal prior to an initial slot of the TxOP. In some examples, the signaling component 725 may measure the signal quality associated with the reference signal. In some cases, the grant may include an indication of the at least one unavailable radio frequency spectrum subband within the BWP. The signal quality may include one or more of an SNR, an SINR, an RSRP, an RSSI, or an RSRQ. In some cases, the reference signal may be a wideband DMRS. In some cases, the reference signal may be one or more narrowband DMRS based on the at least one unavailable radio frequency spectrum subband within the BWP.

FIG. 8 shows a diagram of a system 800 including a device 805 that supports a multi-stage receiver design covering listen before talk failures in accordance with various aspects of the present disclosure. The device 805 may be an example of or include the components of device 505 (as shown in FIG. 5), device 605 (as shown in FIG. 6), or a UE 115 (as shown in FIG. 1) as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may configure a set of channel estimation parameters associated with a set of radio frequency spectrum subbands of a BWP in an unlicensed radio frequency spectrum band, identify, in a TxOP, at least one unavailable radio frequency spectrum subband of the set of radio frequency spectrum subbands within the BWP, and reconfigure one or more channel estimation parameters of the configured set of channel estimation parameters based on the identifying.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include antenna 825 as a single antenna. However, in some cases the device 805 may have one or more additional antennas with antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting multi-stage receiver design covering listen before talk failures).

The processor 840 of the device 805 (e.g., controlling the receiver 510, the transmitter 520, or the transceiver 820) may reduce power consumption and increase channel estimation reliability based on identifying unavailable radio frequency spectrum subbands. In some examples, the processor 840 of the device 805 may reconfigure channel estimation parameters for channel estimation in a TxOP. For example, the processor 840 of the device 805 may turn on one or more processing units for performing a channel estimation, increase a processing clock, or a similar mechanism within the device 805. As such, when subsequent transmissions are received in the TxOP, the processor 840 may be ready to respond more efficiently through the reduction of a ramp up in processing power. The improvements in power saving and channel estimation reliability may further increase battery life at the device 805 (for example, by eliminating unnecessary channel estimation processes, etc.).

Figure 9:
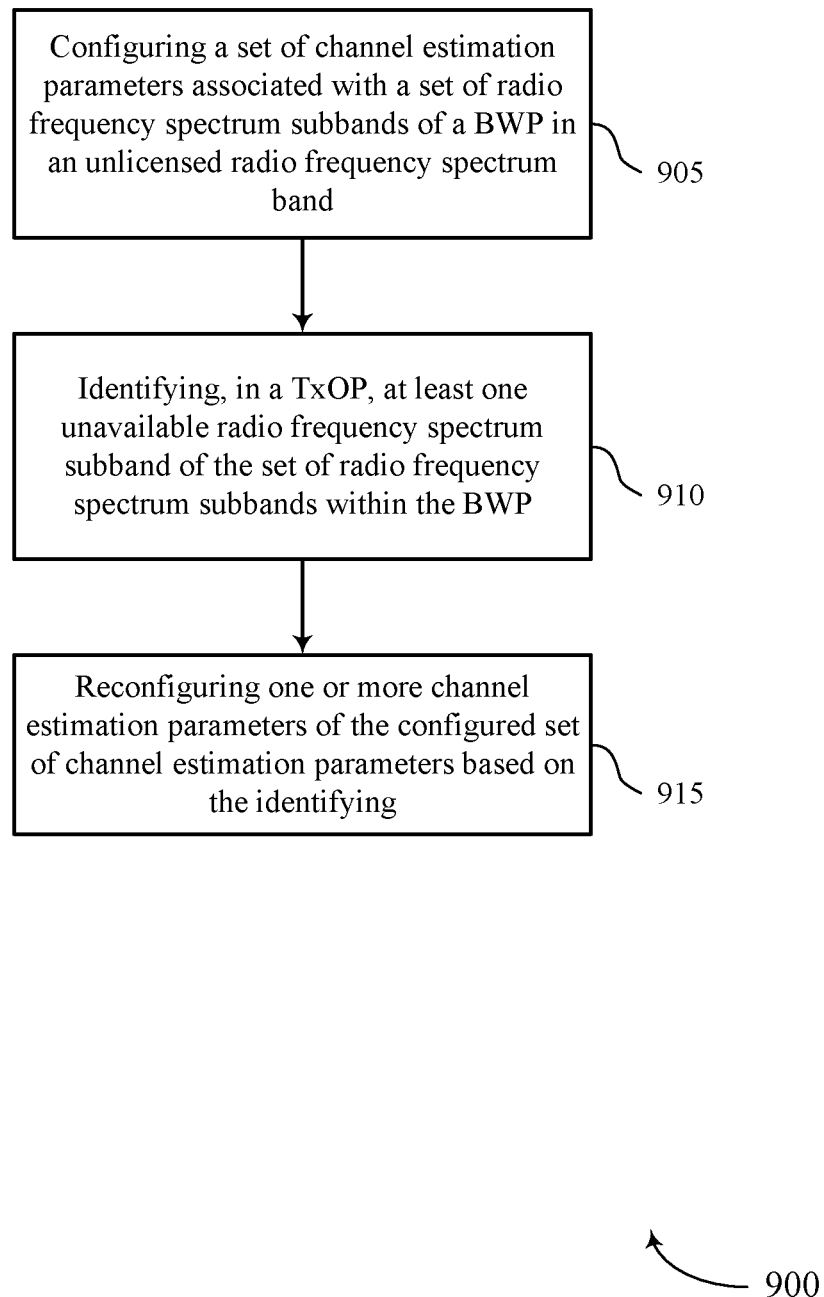
FIGS. 9 through 12 show flowcharts illustrating methods that support a multi-stage receiver design covering listen before talk failures in accordance with various aspects of the present disclosure.

FIG. 9 shows a flowchart illustrating a method 900 that supports a multi-stage receiver design covering listen before talk failures in accordance with various aspects of the present disclosure. The operations of method 900 may be implemented by a UE 115 (as shown in FIG. 1) or its components as described herein. For example, the operations of method 900 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may configure a set of channel estimation parameters associated with a set of radio frequency spectrum subbands of a BWP in an unlicensed radio frequency spectrum band. The operations of 905 may be performed according to the methods described herein. In some examples, aspects of the operations of 905 may be performed by a channel estimation component as described with reference to FIGS. 5 through 8.

At 910, the UE may identify, in a TxOP, at least one unavailable radio frequency spectrum subband of the set of radio frequency spectrum subbands within the BWP. The operations of 910 may be performed according to the methods described herein. In some examples, aspects of the operations of 910 may be performed by a subband identifier as described with reference to FIGS. 5 through 8.

At 915, the UE may reconfigure one or more channel estimation parameters of the configured set of channel estimation parameters based on the identifying. The operations of 915 may be performed according to the methods described herein. In some examples, aspects of the operations of 915 may be performed by a channel estimation component as described with reference to FIGS. 5 through 8.

Figure 10:
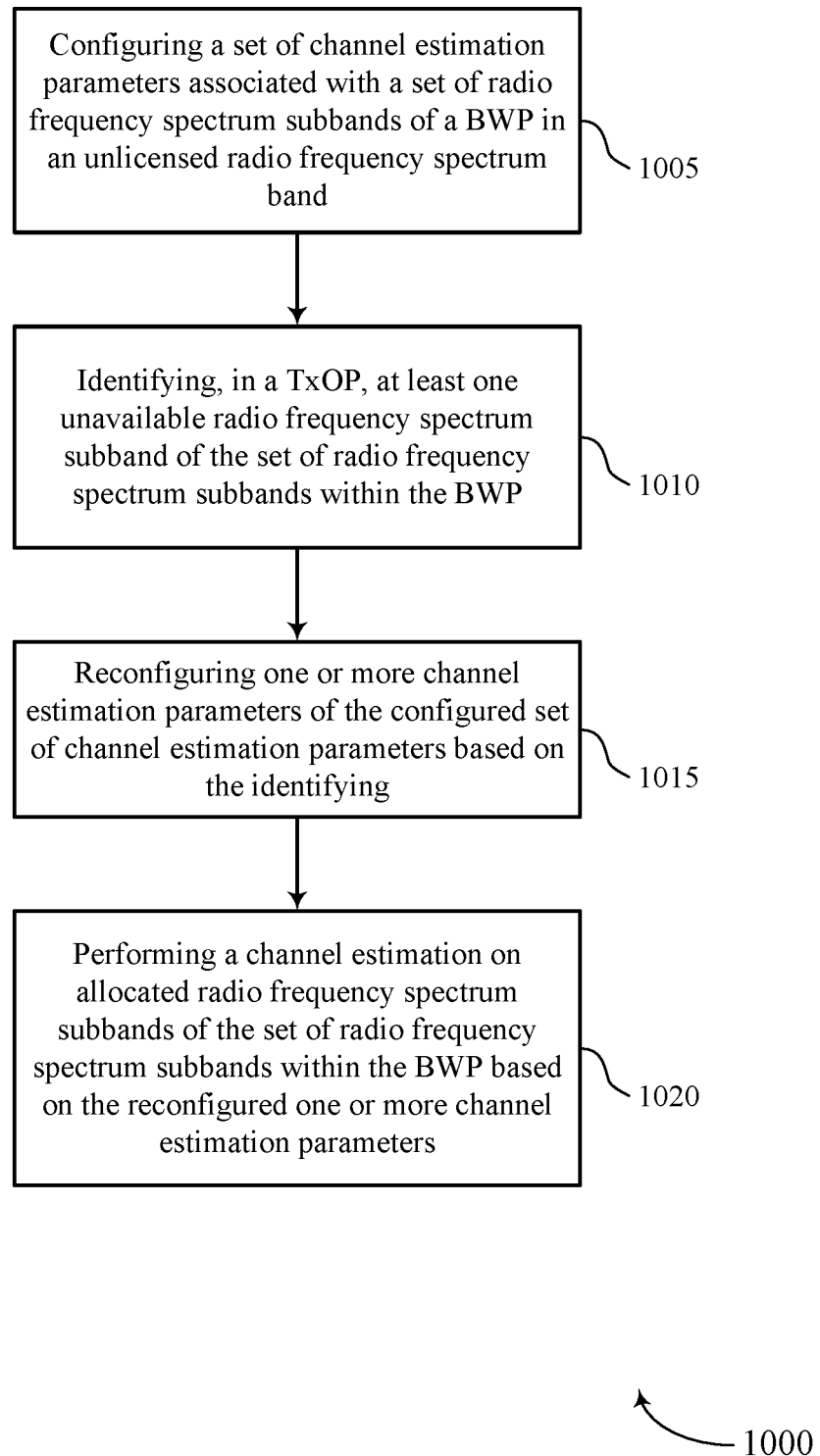

FIG. 10 shows a flowchart illustrating a method 1000 that supports a multi-stage receiver design covering listen before talk failures in accordance with various aspects of the present disclosure. The operations of method 1000 may be implemented by a UE 115 (as shown in FIG. 1) or its components as described herein. For example, the operations of method 1000 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may configure a set of channel estimation parameters associated with a set of radio frequency spectrum subbands of a BWP in an unlicensed radio frequency spectrum band. The operations of 1005 may be performed according to the methods described herein. In some examples, aspects of the operations of 1005 may be performed by a channel estimation component as described with reference to FIGS. 5 through 8.

At 1010, the UE may identify, in a TxOP, at least one unavailable radio frequency spectrum subband of the set of radio frequency spectrum subbands within the BWP. The operations of 1010 may be performed according to the methods described herein. In some examples, aspects of the operations of 1010 may be performed by a subband identifier as described with reference to FIGS. 5 through 8.

At 1015, the UE may reconfigure one or more channel estimation parameters of the configured set of channel estimation parameters based on the identifying. The operations of 1015 may be performed according to the methods described herein. In some examples, aspects of the operations of 1015 may be performed by a channel estimation component as described with reference to FIGS. 5 through 8.

At 1020, the UE may perform a channel estimation on allocated radio frequency spectrum subbands of the set of radio frequency spectrum subbands within the BWP based on the reconfigured one or more channel estimation parameters. The operations of 1020 may be performed according to the methods described herein. In some examples, aspects of the operations of 1020 may be performed by a channel estimation component as described with reference to FIGS. 5 through 8.

Figure 11:
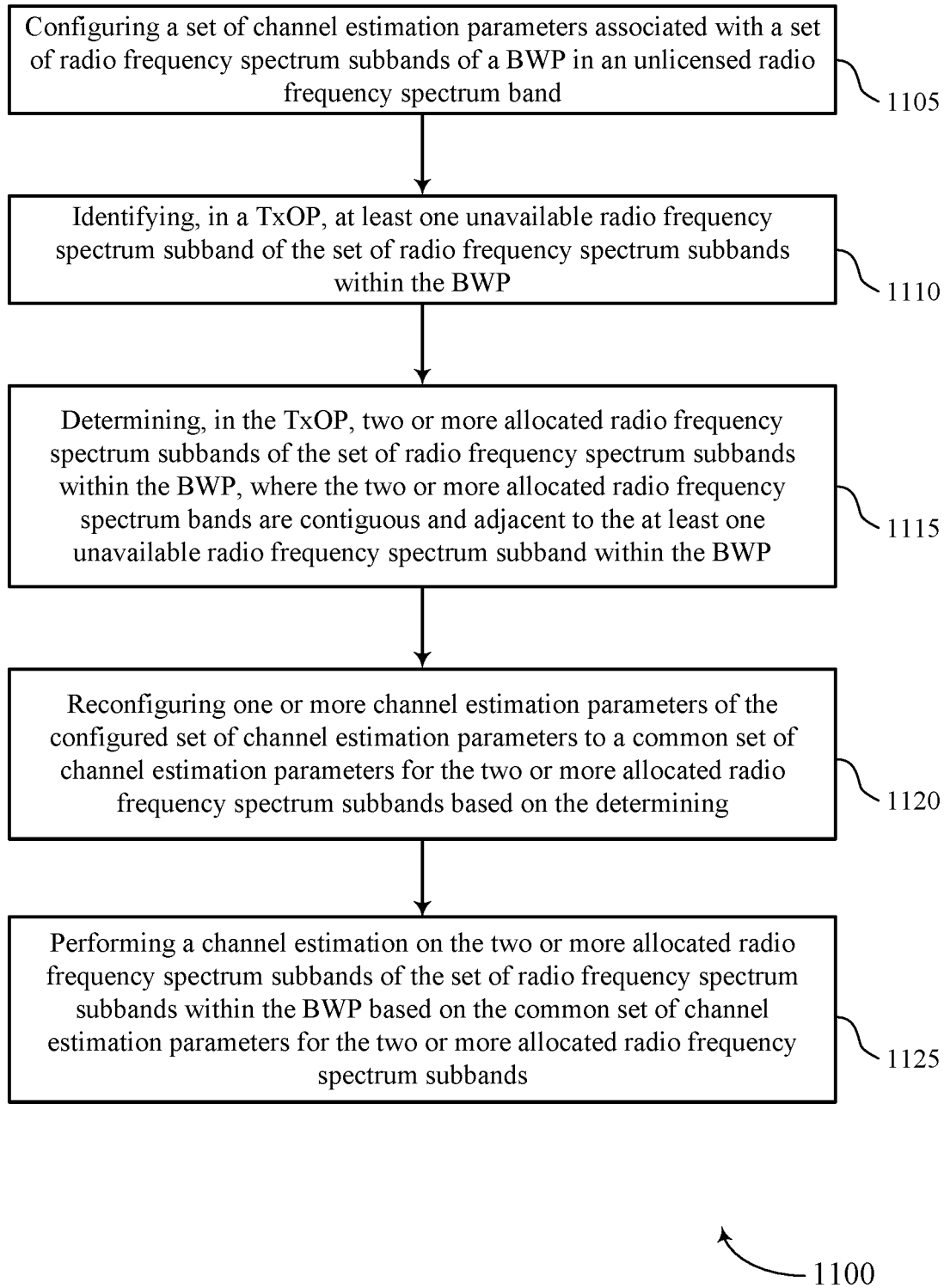

FIG. 11 shows a flowchart illustrating a method 1100 that supports a multi-stage receiver design covering listen before talk failures in accordance with various aspects of the present disclosure. The operations of method 1100 may be implemented by a UE 115 (as shown in FIG. 1) or its components as described herein. For example, the operations of method 1100 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may configure a set of channel estimation parameters associated with a set of radio frequency spectrum subbands of a BWP in an unlicensed radio frequency spectrum band. The operations of 1105 may be performed according to the methods described herein. In some examples, aspects of the operations of 1105 may be performed by a channel estimation component as described with reference to FIGS. 5 through 8.

At 1110, the UE may identify, in a TxOP, at least one unavailable radio frequency spectrum subband of the set of radio frequency spectrum subbands within the BWP. The operations of 1110 may be performed according to the methods described herein. In some examples, aspects of the operations of 1110 may be performed by a subband identifier as described with reference to FIGS. 5 through 8.

At 1115, the UE may determine, in the TxOP, two or more allocated radio frequency spectrum subbands of the set of radio frequency spectrum subbands within the BWP, where the two or more allocated radio frequency spectrum bands are contiguous and adjacent to the at least one unavailable radio frequency spectrum subband within the BWP. The operations of 1115 may be performed according to the methods described herein. In some examples, aspects of the operations of 1115 may be performed by a subband identifier as described with reference to FIGS. 5 through 8.

At 1120, the UE may reconfigure one or more channel estimation parameters of the configured set of channel estimation parameters to a common set of channel estimation parameters for the two or more allocated radio frequency spectrum subbands based on the determining. The operations of 1120 may be performed according to the methods described herein. In some examples, aspects of the operations of 1120 may be performed by a channel estimation component as described with reference to FIGS. 5 through 8.

At 1125, the UE may perform a channel estimation on the two or more allocated radio frequency spectrum subbands of the set of radio frequency spectrum subbands within the BWP based on the common set of channel estimation parameters for the two or more allocated radio frequency spectrum subbands. The operations of 1125 may be performed according to the methods described herein. In some examples, aspects of the operations of 1125 may be performed by a channel estimation component as described with reference to FIGS. 5 through 8.

Figure 12:
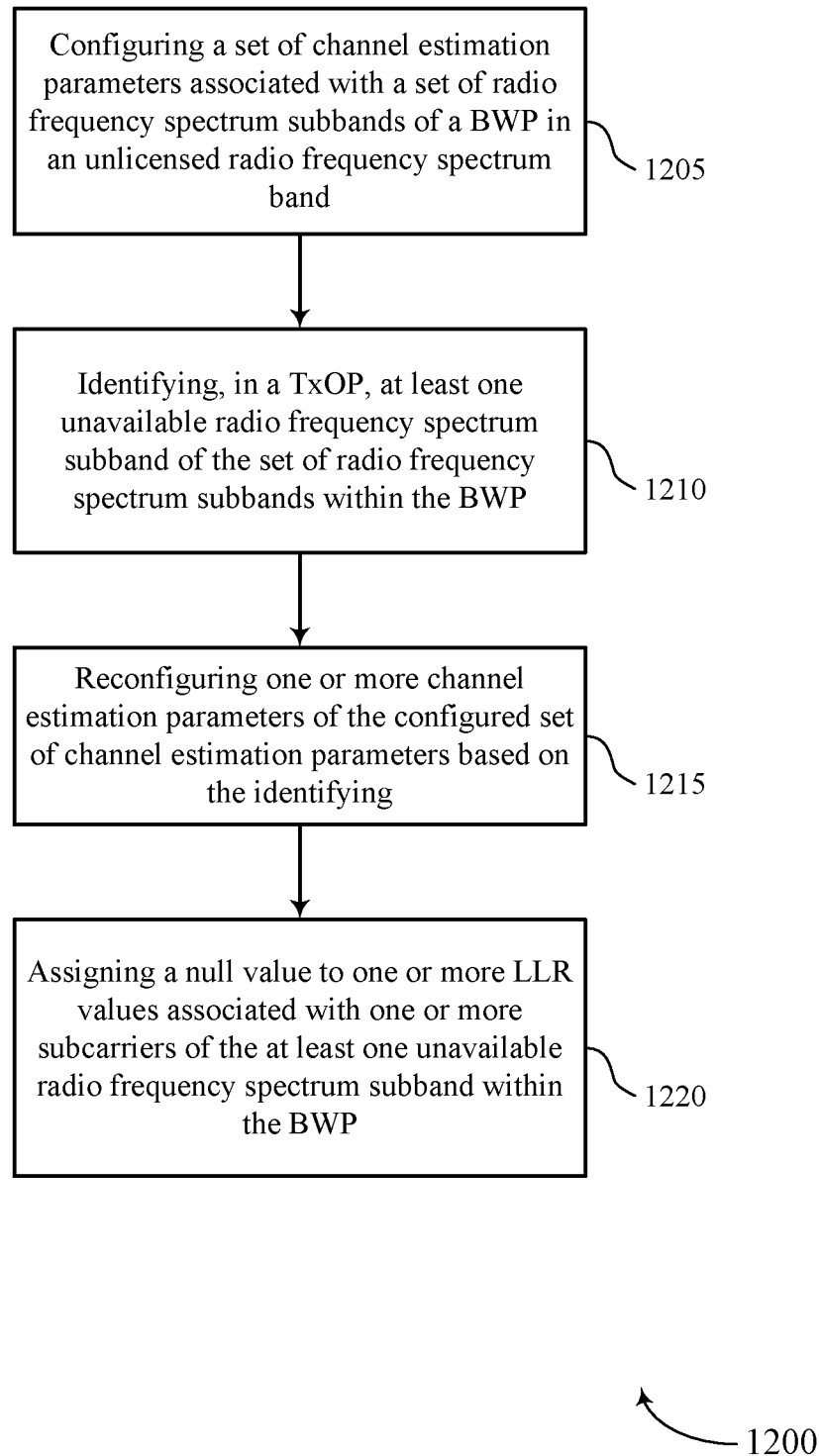

FIG. 12 shows a flowchart illustrating a method 1200 that supports a multi-stage receiver design covering listen before talk failures in accordance with various aspects of the present disclosure. The operations of method 1200 may be implemented by a UE 115 (as shown in FIG. 1) or its components as described herein. For example, the operations of method 1200 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the UE may configure a set of channel estimation parameters associated with a set of radio frequency spectrum subbands of a BWP in an unlicensed radio frequency spectrum band. The operations of 1205 may be performed according to the methods described herein. In some examples, aspects of the operations of 1205 may be performed by a channel estimation component as described with reference to FIGS. 5 through 8.

At 1210, the UE may identify, in a TxOP, at least one unavailable radio frequency spectrum subband of the set of radio frequency spectrum subbands within the BWP. The operations of 1210 may be performed according to the methods described herein. In some examples, aspects of the operations of 1210 may be performed by a subband identifier as described with reference to FIGS. 5 through 8.

At 1215, the UE may reconfigure one or more channel estimation parameters of the configured set of channel estimation parameters based on the identifying. The operations of 1215 may be performed according to the methods described herein. In some examples, aspects of the operations of 1215 may be performed by a channel estimation component as described with reference to FIGS. 5 through 8.

At 1220, the UE may assign a null value to one or more LLR values associated with one or more subcarriers of the at least one unavailable radio frequency spectrum subband within the BWP. The operations of 1220 may be performed according to the methods described herein. In some examples, aspects of the operations of 1220 may be performed by a demapper as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell for example covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:
    configuring a set of channel estimation parameters associated with a set of radio frequency spectrum subbands of a bandwidth part in an unlicensed radio frequency spectrum band;
    identifying, in a transmission opportunity, at least one unavailable radio frequency spectrum subband of the set of radio frequency spectrum subbands within the bandwidth part and two or more available radio frequency spectrum subbands of the set of radio frequency spectrum subbands that are contiguous within the bandwidth part; and
    reconfiguring one or more channel estimation parameters of the configured set of channel estimation parameters corresponding to each radio frequency spectrum subband of the two or more available radio frequency spectrum subbands of the set of radio frequency spectrum subbands within the bandwidth part to a common set of channel estimation parameters for the two or more available radio frequency spectrum subbands, the reconfiguring being based at least in part on the identifying.

2. The method of claim 1, further comprising:
    performing a channel estimation on the two or more available radio frequency spectrum subbands of the set of radio frequency spectrum subbands within the bandwidth part based at least in part on the reconfigured common set of channel estimation parameters.

3. The method of claim 1,
    wherein the two or more available radio frequency spectrum subbands are adjacent to the at least one unavailable radio frequency spectrum subband within the bandwidth part.

4. The method of claim 1, further comprising:
    performing a channel estimation on the two or more available radio frequency spectrum subbands of the set of radio frequency spectrum subbands within the bandwidth part based at least in part on the common set of channel estimation parameters for the two or more available radio frequency spectrum subbands.

5. The method of claim 1, further comprising:
refraining from performing a channel estimation on the at least one unavailable radio frequency spectrum subband within the bandwidth part.

6. The method of claim 1, further comprising:
assigning a null value to one or more log-likelihood ratio (LLR) values associated with one or more subcarriers of the at least one unavailable radio frequency spectrum subband within the bandwidth part.

7. The method of claim 1, further comprising:
receiving, from a network entity, signaling to indicate the at least one unavailable radio frequency spectrum subband of the set of radio frequency spectrum subbands within the bandwidth part,
wherein identifying, in the transmission opportunity, the at least one unavailable radio frequency spectrum subband of the set of radio frequency spectrum subbands within the bandwidth part is based at least in part on the signaling.

8. The method of claim 1, further comprising:
receiving a grant including a resource allocation associated with the transmission opportunity; and
identifying the set of radio frequency spectrum subbands of the bandwidth part based at least in part on the resource allocation.

9. The method of claim 8, wherein the grant comprises an indication of the at least one unavailable radio frequency spectrum subband within the bandwidth part.

10. The method of claim 8, wherein receiving the grant comprises:
receiving downlink control information on a physical downlink control channel, the downlink control information including the resource allocation associated with the transmission opportunity and an indication of the at least one unavailable radio frequency spectrum subband within the bandwidth part.

11. The method of claim 1, further comprising:
receiving a reference signal prior to an initial slot of the transmission opportunity; and
measuring a signal quality associated with the reference signal,
wherein identifying, in the transmission opportunity, the at least one unavailable radio frequency spectrum subband within the bandwidth part is based at least in part on the signal quality satisfying a threshold.

12. The method of claim 11, wherein the signal quality comprises one or more of a signal to noise ratio (SNR), a signal to interference plus noise ratio (SINR), a reference signal received power (RSRP), a received signal strength indicator (RSSI), or a reference signal received quality (RSRQ).

13. The method of claim 11, wherein the reference signal comprises a wideband (WB) demodulation reference signal (DMRS).

14. The method of claim 1, wherein each radio frequency spectrum subband of the set of radio frequency spectrum subbands of the bandwidth part has a separate set of channel estimation parameters.

15. An apparatus for wireless communication, comprising:
a processor,
memory coupled with the processor; and
instructions stored in the memory and executable by the processor to cause the apparatus to:
configure a set of channel estimation parameters associated with a set of radio frequency spectrum subbands of a bandwidth part in an unlicensed radio frequency spectrum band;
identify, in a transmission opportunity, at least one unavailable radio frequency spectrum subband of the set of radio frequency spectrum subbands within the bandwidth part and two or more available radio frequency spectrum subbands of the set of radio frequency spectrum subbands that are contiguous within the bandwidth part; and
reconfigure one or more channel estimation parameters of the configured set of channel estimation parameters corresponding to each radio frequency spectrum subband of the two or more available radio frequency spectrum subbands of the set of radio frequency spectrum subbands within the bandwidth part to a common set of channel estimation parameters for the two or more available radio frequency spectrum subbands, wherein reconfiguring the one or more channel estimation parameters is based at least in part on identifying the at least one unavailable radio frequency spectrum subband.

16. The apparatus of claim 15, wherein the instructions are further executable by the processor to cause the apparatus to:
perform a channel estimation on the two or more available radio frequency spectrum subband of the set of radio frequency spectrum subbands within the bandwidth part based at least in part on the reconfigured common set of channel estimation parameters.

17. The apparatus of claim 15,
wherein the two or more available radio frequency spectrum subbands are contiguous and adjacent to the at least one unavailable radio frequency spectrum subband within the bandwidth part.

18. The apparatus of claim 15, wherein the instructions are further executable by the processor to cause the apparatus to:
perform a channel estimation on the two or more available radio frequency spectrum subbands of the set of radio frequency spectrum subbands within the bandwidth part based at least in part on the common set of channel estimation parameters for the two or more available radio frequency spectrum subbands.

19. The apparatus of claim 15, wherein the instructions are further executable by the processor to cause the apparatus to:
refrain from performing a channel estimation on the at least one unavailable radio frequency spectrum subband within the bandwidth part.

20. The apparatus of claim 15, wherein the instructions to reconfigure the one or more channel estimation parameters of the configured set of channel estimation parameters are executable by the processor to cause the apparatus to:
assign a null value to one or more log-likelihood ratio (LLR) values associated with one or more subcarriers of the at least one unavailable radio frequency spectrum subband within the bandwidth part.

21. The apparatus of claim 15, wherein the instructions are further executable by the processor to cause the apparatus to:
receive, from a network entity, signaling to indicate the at least one unavailable radio frequency spectrum subband of the set of radio frequency spectrum subbands within the bandwidth part, wherein the instructions to identify, in the transmission opportunity, the at least one unavailable radio frequency spectrum subband of the set of radio frequency spectrum subbands within the bandwidth part are further executable by the processor to identify the at least one unavailable radio frequency spectrum subband of the set of radio frequency spectrum subbands within the bandwidth part based at least in part on the signaling.

22. The apparatus of claim 15, wherein the instructions are further executable by the processor to cause the apparatus to:
receive a grant including a resource allocation associated with the transmission opportunity; and
identify the set of radio frequency spectrum subbands of the bandwidth part based at least in part on the resource allocation.

23. The apparatus of claim 22, wherein the grant comprises an indication of the at least one unavailable radio frequency spectrum subband within the bandwidth part.

24. The apparatus of claim 22, wherein the instructions to receive the grant are executable by the processor to cause the apparatus to:
receive downlink control information on a physical downlink control channel, the downlink control information including the resource allocation associated with the transmission opportunity and an indication of the at least one unavailable radio frequency spectrum subband within the bandwidth part.

25. The apparatus of claim 15, wherein the instructions are further executable by the processor to cause the apparatus to:
receive a reference signal prior to an initial slot of the transmission opportunity; and
measure a signal quality associated with the reference signal,
wherein the instructions to identify, in the transmission opportunity, the at least one unavailable radio frequency spectrum subband within the bandwidth part are further executable by the processor to identify the at least one unavailable radio frequency spectrum subband within the bandwidth part based at least in part on the signal quality satisfying a threshold.

26. The apparatus of claim 25, wherein the signal quality comprises one or more of a signal to noise ratio (SNR), a signal to interference plus noise ratio (SINR), a reference signal received power (RSRP), a received signal strength indicator (RSSI), or a reference signal received quality (RSRQ).

27. The apparatus of claim 25, wherein the reference signal comprises a wideband (WB) demodulation reference signal (DMRS).

28. The apparatus of claim 15, wherein each radio frequency spectrum subband of the set of radio frequency spectrum subbands of the bandwidth part has a separate set of channel estimation parameters.

29. An apparatus for wireless communication, comprising:
means for configuring a set of channel estimation parameters associated with a set of radio frequency spectrum subbands of a bandwidth part in an unlicensed radio frequency spectrum band;
means for identifying, in a transmission opportunity, at least one unavailable radio frequency spectrum subband of the set of radio frequency spectrum subbands within the bandwidth part and two or more available radio frequency spectrum subbands of the set of radio frequency spectrum subbands that are contiguous within the bandwidth part; and
means for reconfiguring one or more channel estimation parameters of the configured set of channel estimation parameters corresponding to each radio frequency spectrum subband of the two or more available radio frequency spectrum subbands of the set of radio frequency spectrum subbands within the bandwidth part to a common set of channel estimation parameters for the two or more available radio frequency spectrum subbands, the reconfiguring being based at least in part on the identifying.

30. A non-transitory computer-readable medium storing code for wireless communication at a user equipment, the code comprising instructions executable by a processor to:
configure a set of channel estimation parameters associated with a set of radio frequency spectrum subbands of a bandwidth part in an unlicensed radio frequency spectrum band;
identify, in a transmission opportunity, at least one unavailable radio frequency spectrum subband of the set of radio frequency spectrum subbands within the bandwidth part and two or more available radio frequency spectrum subbands of the set of radio frequency spectrum subbands that are contiguous within the bandwidth part; and
reconfigure one or more channel estimation parameters of the configured set of channel estimation parameters corresponding to each radio frequency spectrum subband of the two or more available radio frequency spectrum subbands of the set of radio frequency spectrum subbands within the bandwidth part to a common set of channel estimation parameters for the two or more available radio frequency spectrum subbands, wherein reconfiguring the one or more channel estimation parameters is based at least in part on identifying the at least one unavailable radio frequency spectrum subband.

* * * * *